United States Patent [19]

Berman

[11] Patent Number: 5,247,174

[45] Date of Patent: Sep. 21, 1993

[54] LASER SCANNING APPARATUS HAVING A SCANNING BEAM AND A REFERENCE BEAM

[75] Inventor: Dov Berman, Hofit, Israel

[73] Assignee: Scitex Corporation Ltd., Herzliya, Israel

[21] Appl. No.: 691,228

[22] Filed: Apr. 25, 1991

[30] Foreign Application Priority Data

May 7, 1990 [IL] Israel ......................................... 94308

[51] Int. Cl.⁵ ............................................. H01J 3/14
[52] U.S. Cl. .................................. 250/235; 250/201.1
[58] Field of Search ........... 250/205, 235, 236, 227.11, 250/227.12, 227.26, 227.28, 201.1; 358/293, 493; 385/147

[56] References Cited

U.S. PATENT DOCUMENTS

| | | | |
|---|---|---|---|
| 4,307,409 | 12/1981 | Greenig et al. | 250/227.28 |
| 4,523,093 | 6/1985 | Neumann | 358/293 |
| 4,739,162 | 4/1988 | Ortiz, Jr. et al. | 250/227.26 |
| 4,746,180 | 5/1988 | Deisler et al. | 385/147 |
| 4,834,520 | 5/1989 | Klainman | 350/584 |
| 4,866,464 | 9/1989 | Straayer | 250/236 |
| 4,931,637 | 6/1990 | Succari et al. | 250/227.26 |

FOREIGN PATENT DOCUMENTS 0263774 4/1988 European Pat. Off. .
78216 3/1986 Israel .
9001716 2/1990 PCT Int'l Appl. .

OTHER PUBLICATIONS

S. Bousky and L. Teeple, "Laser Recording Performance with Spatial Error Compensation". *SPIE*, vol. 53, 1973.
D. P. Jablonowski and J. Raamot, "Beam Deflection at High Accuracy and Precision", *SPIE* vol. 84, 1976.
M. R. Smith, R. H. Burns, and R. C. Tsai, "Ultrahigh Resolution Graphic Data Terminal", *SPIE* vol. 200, 1979.
F. Bestenreiner et al., "Visibility and Correction of Periodic Interference Structures in Line-by-Line Recorded Images", *J. of Appl. Phot. Eng.* vol. 2, 1976.

Primary Examiner—David C. Nelms
Assistant Examiner—S. Allen
Attorney, Agent, or Firm—Ladas & Parry

[57] ABSTRACT

Laser scanning apparatus comprising stationary optical laser source apparatus for producing a scanning beam and a reference beam, beam delivery apparatus for delivering the scanning beam onto a surface to be scanned, beam position detector apparatus for measuring the position of the scanning beam by sensing the position of the reference beam and fiber optic apparatus for delivering the scanning beam and the reference beam from the optical laser source apparatus to the beam delivery apparatus.

16 Claims, 6 Drawing Sheets

LASER SCANNING APPARATUS HAVING A SCANNING BEAM AND A REFERENCE BEAM

FIELD OF THE INVENTION

The present invention relates to laser beam scanning apparatus generally, and to laser beam scanning apparatus utilizing fiber optics in particular. The term "scanning" is taken to indicate both the read-in of data from an image to be scanned and the write-out of data to produce an image.

BACKGROUND OF THE INVENTION

There exist various techniques for measuring and accurately positioning laser beams. The following early publications represent the general state of the prior art:

"Laser Recording Performance With Spatial Error Compensation", S. Bousky and L. Teeple, *SPIE*, Vol 53, 1973. In this paper, a polygon deflector is employed together with a reference line for determining cross scan error. Two-dimensional corrections are made to the beam position, which is measured differentially.

"Beam Deflection at High Accuracy and Precision", D. P. Jablonowski and J. Raamot, *SPIE*, Vol 84, 1976. This paper describes X-Y deflection using galvanometer-driven mirrors or polygons, using crossed gratings to measure two-dimensional position information. A reference beam is deflected to measure position and is used to measure the beam position in two dimensions during writing.

"Ultrahigh Resolution Data Terminal", M. R. Smith, R. H. Burns and R. C. Tsai, *SPIE*, Vol. 200, 1979. This paper describes a high resolution display that uses a laser to address a liquid crystal gate. Deflection is performed by a galvanometer-driven mirror. A reference beam hits a crossed Ronchi grating and the resulting information is used to instantaneously determine the two-dimensional coordinates of the beam.

One of the main problems encountered in high-quality laser beam scanning relates to accurate positioning of a laser generated dot relative to adjacent dots, as noted in the literature (e.g. Bestenheimer et al. in Journal of Appl. Phot. Eng. vol. 2, 1976). The human eye has extreme sensitivity to periodic errors in the interline separation of beams. Periodic errors resulting from intensity changes, or positional fluctuations, can lead to banding of high visibility. Passive and active methods have been used to minimize these errors.

Various laser scanning devices are known in the art. They typically comprise a laser source and optical elements for bringing the laser light produced by the laser source to a scanning medium.

U.S. Pat. No. 4,746,180 to Deisler et. al. describes a laser scanning device composed of at least one multi-mode fiber optical light lightguide and one guide element for the fiber optical lightguide. As is known in the art, multi-mode fiber optical lightguides will produce inhomogeneous light distributions on an exit face in the face of a change of curvature, typically due to motion of one portion of the lightguide. Thus, the device of U.S. Pat. No. 4,746,180 utilizes a rigid guide element to ensure that the curvature of the multi-mode fiber optical lightguide is maintained during movement of the exit face of the lightguide. It is a further purpose of the present invention to utilize fiber optical lightguides which can move freely while maintaining a constant light distribution at their exit faces.

SUMMARY OF THE INVENTION

The present invention seeks to provide laser beam scanning apparatus utilizing single-mode fiber optics.

There is therefore provided, in accordance with a preferred embodiment of the present invention, laser scanning apparatus comprising stationary optical laser source apparatus for producing a scanning beam and a reference beam, beam delivery apparatus for delivering the scanning beam onto a surface to be scanned, beam position detector apparatus for measuring the position of the scanning beam by sensing the position of the reference beam and fiber optic apparatus for delivering the scanning beam and the reference beam from the optical laser source apparatus to the beam delivery apparatus.

Additionally, in accordance with a preferred embodiment of the present invention, the fiber optic apparatus comprises at least one single-mode fiber optic lightguide.

Further, in accordance with a preferred embodiment of the present invention, the laser scanning apparatus also comprises actuator apparatus attached to exit ends of the fiber optic apparatus and closed loop control apparatus for controlling the actuator apparatus in response to measurements produced by the beam detector apparatus. The actuator apparatus is a piezoelectric actuator.

Still further, in accordance with a preferred embodiment of the present invention, the beam delivery apparatus includes motor apparatus for translation thereof.

Moreover, in accordance with a preferred embodiment of the present invention, the closed loop control apparatus also includes pre-positioning apparatus for counteracting known initial variations in the beam delivery apparatus.

Additionally, in accordance with a preferred embodiment of the present invention, the laser scanning apparatus also comprises apparatus for adjusting the intensity of the scanning beam as a function of its relative position along the scanning axis. It also comprises apparatus for synchronizing data flow with the position of the scanning beam.

Furthermore, there is provided, in accordance with an alternative embodiment of the present invention, laser scanning apparatus comprising stationary optical laser source apparatus for producing a laser beam, beam delivery apparatus for delivering the laser beam onto a surface to be scanned, fiber optic apparatus having at least one exit end for delivering the laser beam from the optical laser source apparatus to the beam delivery apparatus and actuator apparatus attached to the at least one exit end of the fiber optic apparatus for moving the at least one exit end by a predetermined amount.

Finally, there is provided, in accordance with a further alternative embodiment of the present invention, laser scanning apparatus comprising stationary optical laser source apparatus for producing a scanning beam, beam delivery apparatus for delivering the scanning beam onto a surface to be scanned, beam position detector apparatus for measuring the position of the scanning beam and fiber optic apparatus for delivering the scanning beam from the optical laser source apparatus to the beam delivery apparatus.

BRIEF DESCRIPTION OF THE DRAWINGS

The present invention will be understood and appreciated more fully from the following detailed description, taken in conjunction with the drawings in which.

DETAILED DESCRIPTION OF THE PRESENT INVENTION

Figure 1A:
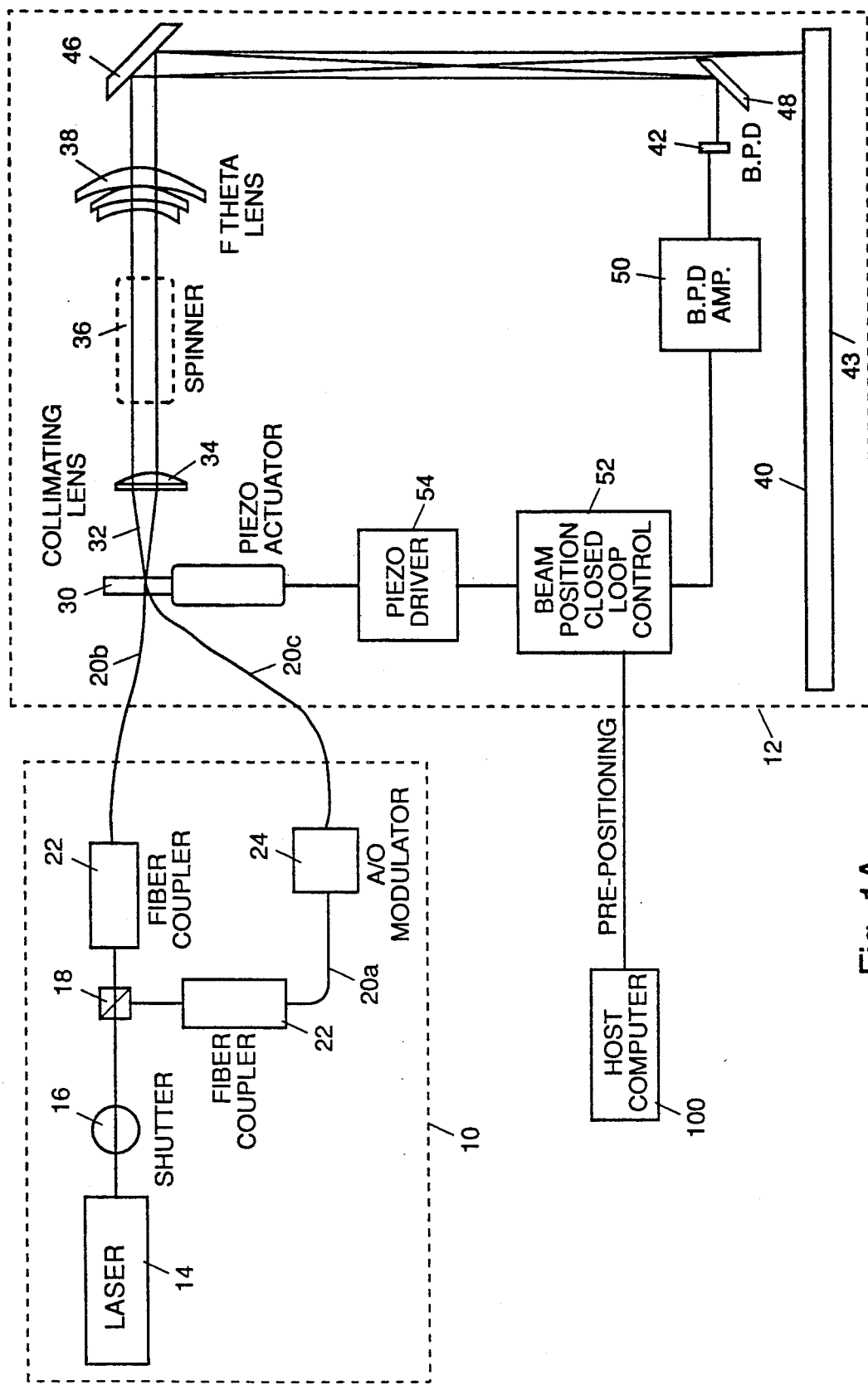
FIG. 1A is a schematic illustration of laser scanning apparatus utilizing fiber optical elements wherein the scanning elements travel along a fixed base, constructed and operative in accordance with a preferred embodiment of the present invention.
Figure 1B:
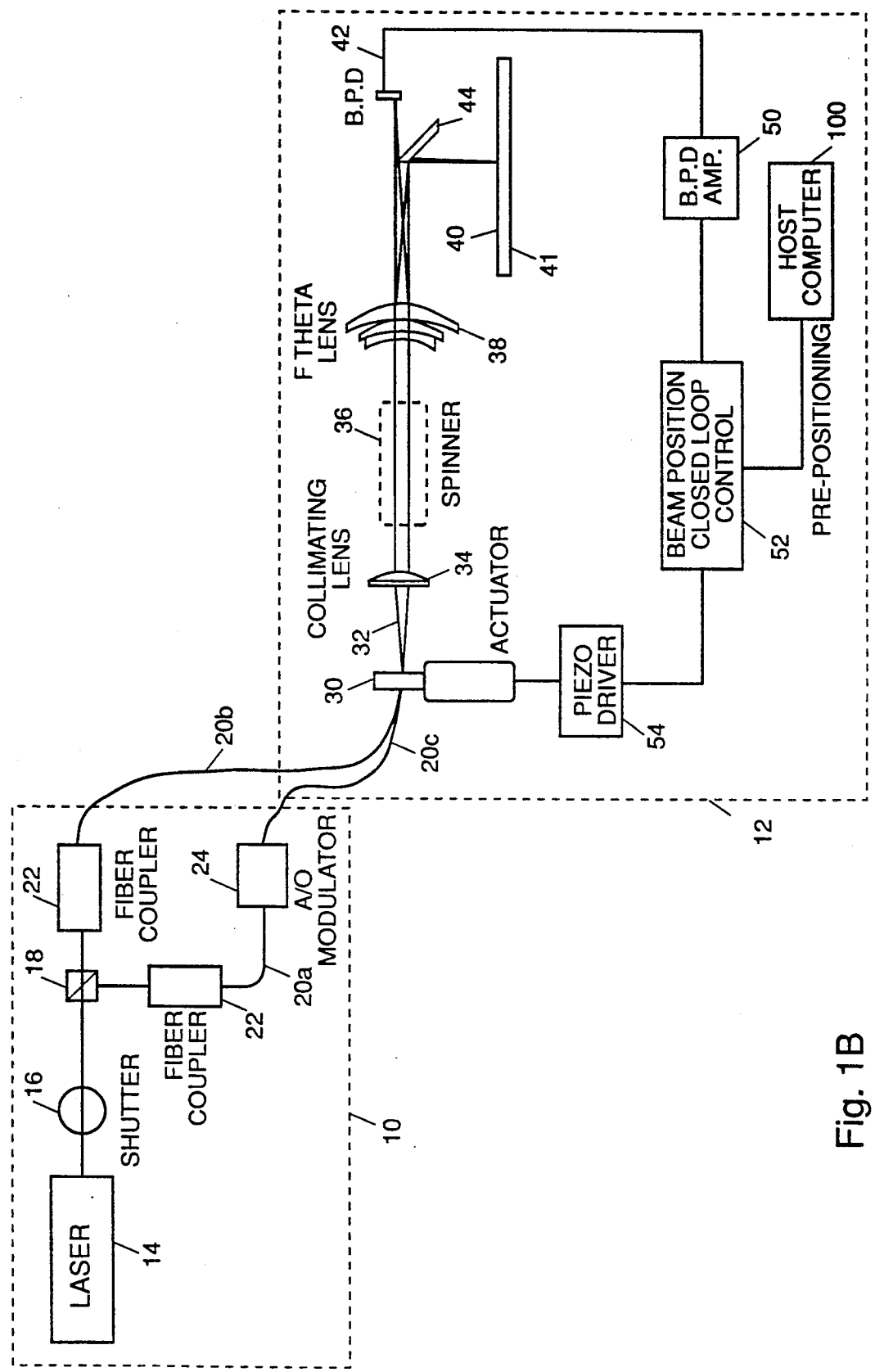
FIG. 1B is a schematic illustration of an alternative embodiment of the laser scanning apparatus of FIG. 1A wherein the scanning elements are fixed with respect to a moving carriage.

Reference is now made to FIGS. 1A and 1B which illustrate two embodiments of the laser scanning apparatus of the present invention. The apparatus comprises a typically stationary optical source system 10 for producing two laser beams, an exposure beam and a reference beam, and a beam delivery system 12 for delivering the two laser beams to the locations at which they act.

The optical source system comprises a laser source 14, such as a He-Ne laser or an Argon laser, or any other suitable laser source, for producing a laser beam, an optional shutter 16 for preventing the laser beam from penetrating the beam delivery system 12 when no laser light is necessary, and a beam splitter 18 for splitting the laser beam into two laser beams, a reference beam and an exposure beam. As will be described in more detail hereinbelow, the exposure beam will be utilized either to produce a pixel in an image to be plotted or to read a pixel in an image to be scanned and the reference beam will be utilized to track the location of the exposure beam on both the x- and y-axes of a scan line.

The exposure and reference beams are respectively transmitted to single-mode fiber optic lightguides 20a or 20b via fiber couplers 22 such as are known in the art. An acousto/optic modulator 24, such as those manufactured by Isomet of Springfield, Va. of the USA, is typically located at the end of lightguide 20a and is operative to regulate the exposure intensity of the exposure beam. The laser beam emerging from a fiber tip of lightguide 20a is typically focussed or collimated into the acousto/optic modulator 24 by a first lens, such as a ball micro lens or a GRIN rod lens. After passing through the acousto/optic modulator 24, the modulated light is refocused into an entrance to a lightguide 20c by a second lens identical to the first.

In a plotter system, acousto/optic modulator 24 is operative to turn on and off the transmission of the exposure beam in accordance with data signals received from a host computer 100.

Fiber optic lightguides 20b and 20c bring the laser beams to the beam delivery system 12 which can be a traveling system as in FIG. 1A or a stationary system as in FIG. 1B. It will be appreciated that utilization of fiber optic lightguides 20 enables the stationary optical source system 10 to be located arbitrarily far away from the beam delivery system 12 without a significant corresponding reduction in the intensity and the quality of the laser beam received by the system 12. It will further be appreciated that since single-mode fiber optic lightguides 20 carry a single propagation mode of light, the quality of the output beam does not vary when a lightguide 20 is bent.

Beam delivery system 12 comprises a piezoelectric actuator 30, such as those manufactured by Physics Instruments Gmbh of W. Germany, to which are attached, in any appropriate manner, exit fiber tips of lightguides 20b and 20c such that the fiber tips of both lightguides are simultaneously moved to a desired location.

The reference and exposure beams are transmitted from the lightguides 20 as a combined beam 32 which remains combined until the latter is reflected onto a scanning medium 40 placed on either a moving carriage 41, as shown in the embodiment of FIG. 1B, or on a stationary base 43, as shown in the embodiment of FIG. 1A.

The combined beam 32 first enters a collimating lens 34. After the combined beam 32 is collimated, it is deflected to a rotating mirror 36 which subsequently deflects the combined beam 32 and projects it through an f-theta lens 38.

The f-theta lens 38 extends the focal lengths of the beams of the combined beam 32 toward the extremities of the arc, thus flattening most of the arc into a straight line. The final adjustment at the extreme ends of the line is accomplished electronically by increasing the intensity of the beam, described in more detail hereinbelow. Thus, the f-theta lens 38 ensures sharp focus of the exposure beam on the scanning medium 40 and of the reference beam on a beam position detector (BPD) 42 along the entire scan line and substantially eliminates wide-angle distortion.

The BPD 42 is operative to measure the location of the reference beam along the x- and y-axes of a scan line. The location data is then utilized in a closed feedback loop to maintain the exposure beam at the correct location on the scan line. A suitable BPD 42 is described in European patent application 0,263,774, published Apr. 13, 1988 and owned by the assignee of the present invention. European patent application 0,263,774 is incorporated herein by reference. U.S. patent application Ser. No. 07/396,805 corresponds to this patent.

In the embodiment of FIG. 1A, both beams are projected from the f-theta lens 38 toward the scanning medium 40 via a mirror 46. From mirror 46, the exposure beam is projected directly onto scanning medium 40, while the reference beam is reflected from a mirror 48 onto the BPD 42.

In the embodiment of FIG. 1B, the reference beam is projected directly onto the BPD 42 from the f-theta lens 38, while the exposure beam is reflected from a mirror 44 onto the scanning medium 40.

A linear scan must be executed along each scan line, where data modulation is synchronized with beam position. The distance between the centers of adjacent points and the point density must also be uniform along the scan line. To accomplish this, the BPD 42 tracks the reference beam along both the x- and y-axes of the scanning medium 40 and supplies the positional information to an electro-optical electronic control (El-Op) subsystem, described in more detail hereinbelow.

Tracking and subsequent beam adjustment along the y-axis ensures a linear scan. The reference beam position on the y-axis is fed into a closed loop that adjusts for variations due to air turbulence and structural limitations. The greatest variation is caused by the rotating mirror 36, since the physical characteristics of each facet differ one from another. Other factors include mirror wobble, vibrations, timing errors, and thermal variations in the system. The closed loop is explained hereinbelow.

The position of the exposure beam along the x-axis must be constantly tracked for synchronization of data modulation with the exposure beam position and for the beam intensity adjustments along the scan line, necessary to ensure uniform point density. The exposure beam position on the x-axis is fed into the El-Op subsystem. The El-Op subsystem executes data modulation and stores, recalls and applies the intensity values for each point in the scan line.

The position of the reference beam on the BPD 42 corresponds to the position of the exposure beam on the scanning medium 40. Thus, tracking the reference beam is necessary and sufficient for locating the exposure beam on the medium 40. In other words, all necessary positional information is supplied by tracking the reference beam. The exposure beam itself is not tracked. The reference and exposure beam positions along a scan line are adjusted together via adjustments of the location of the piezoelectric actuator 30.

The closed feedback loop comprises a BPD amplifier 50 for amplifying the signals received from the BPD 42, a closed loop real time servo control system 52 for producing control signals for the piezoelectric actuator 30 in response to the output of the BPD 42 and in a direction so as to maintain the position of the reference beam on the center of the y-axis of the BPD 42, and a piezoelectric actuator driver 54 for driving the piezoelectric actuator 30 in accordance with the control signals. The control system 52 is typically designed to ensure an appropriately smooth and fast response of the piezoelectric actuator 30 in response to the control signals.

It is a feature of the present invention that the movement of the piezoelectric actuator 30 moves the location of the exit ends of both fiber optic lightguides 20 thereby simultaneously effecting the change in the position of both the reference and exposure beams. It will be noted that the driver 54 operates the piezoelectric actuator 30 around a central positive voltage, such as 50 V.

As is known in the art, each facet of the rotating mirror 36 has its own variation from true. The closed loop system described hereinabove will correct for the variation of each facet as the facet is being used for a scan line, where at the beginning of the scan line, the resultant error signal will be large. The closed loop system will operate to reduce the error signal to 0. As a new facet comes into use however, the error signal will again become large since the correction achieved for one facet is not necessarily proper for another facet.

To reduce the jump in the error signal at each facet, a pre-positioning signal can optionally be sent from the host computer 100 or from a microprocessor 86 (shown in FIG. 3), at the beginning of each scan line to position the beams at a nominal position for the current facet. The pre-positioning signal is calculated by operating the apparatus of the present invention in an open-loop fashion and by measuring for each facet the error the reference beam makes with respect to the center of the BPD 42. The pre-positioning signal for each facet is the signal which will counteract the measured error for that facet.

Figure 2A:
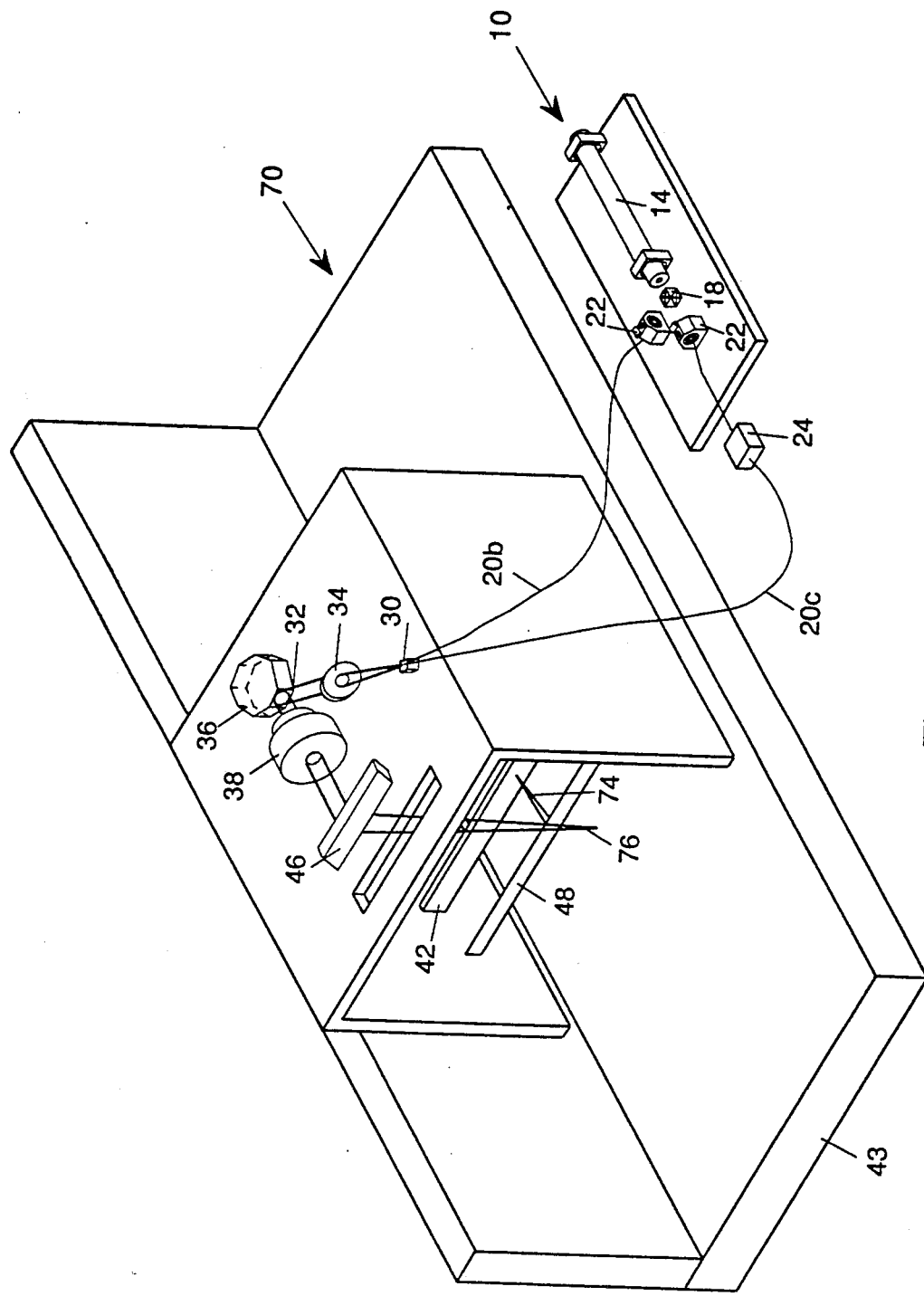
FIG. 2A is a mechanical illustration of the elements of the apparatus of FIG. 1A as well as of the path of a light beam as it moves through the apparatus.
Figure 2B:
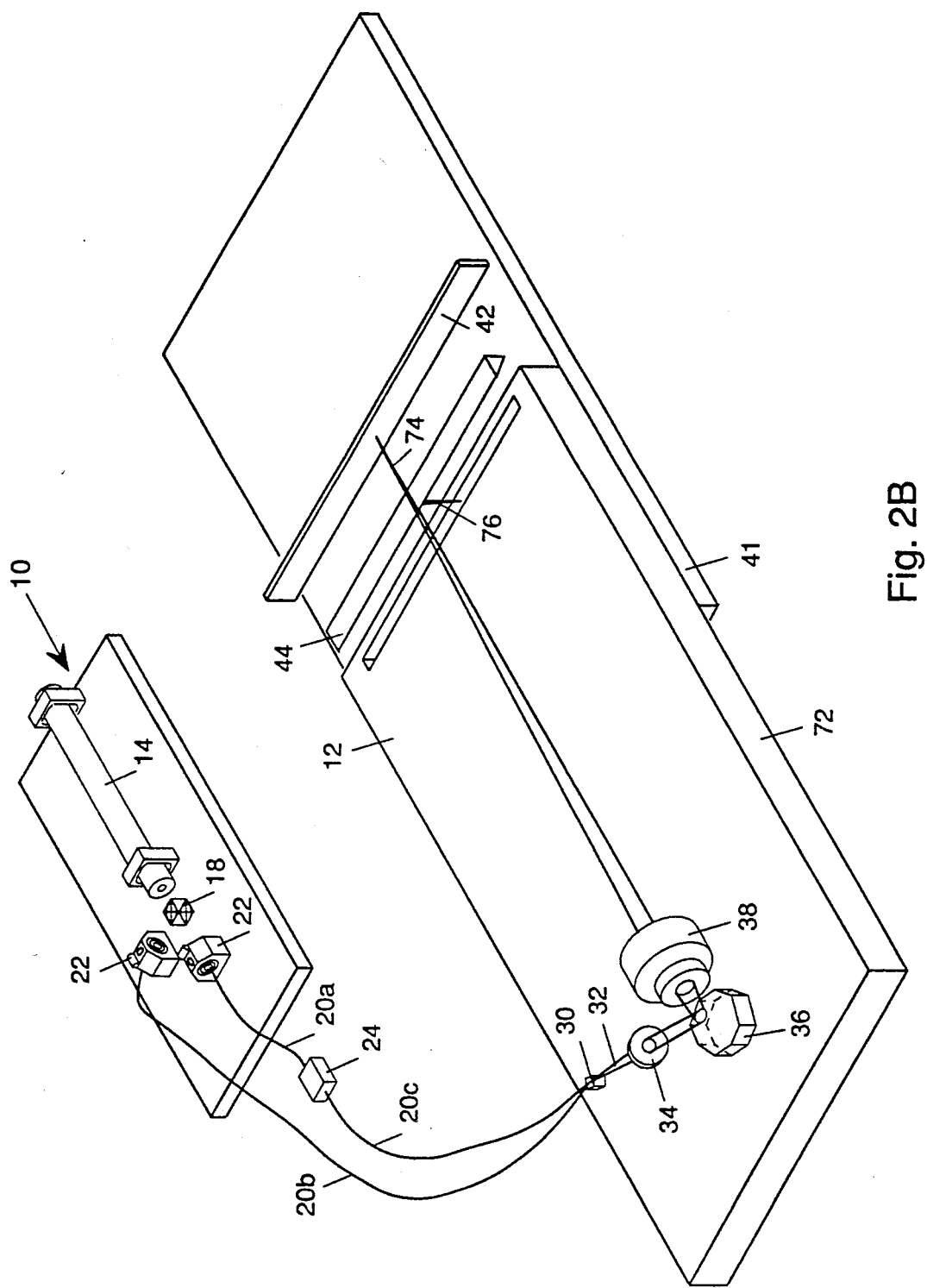
FIG. 2B is a mechanical illustration of the elements of the apparatus of FIG. 1B as well as of the path of a light beam as it moves through the apparatus.

Reference is now made to FIGS. 2A and 2B which respectively mechanically illustrate the apparatus of the present invention for the embodiments of FIGS. 1A and 1B. The stationary optical source system 10 is located to the side of the beam delivery system 12 and the two systems are connected via lightguides 20. In FIG. 2A, the piezoelectric actuator 30, collimating lens 34, rotating mirror 36, f-theta lens 38 and mirror 46 are located on top of a moving housing 70. Moving housing 70 moves along base 43 via motor means (not shown) which can be any suitable motor means, such as a rotary motor connected to moving housing 70 via a lead screw or a linear motor. The BPD 42 and the mirror 48 are located inside housing 70, near base 43.

In FIG. 2B, the elements of the beam delivery system are located in one plane on a stationary surface 72 under which moves carriage 41. In this embodiment, carriage 41 moves back and forth via motor means (not shown) which can be any suitable motor means such as those described hereinabove.

FIGS. 2A and 2B also illustrate the light path for the embodiments of FIGS. 1B and 1A respectively. As mentioned hereinabove, the combined beam 32 leaves the fiber optic lightguides 20 at the piezoelectric actuator 30 and is collimated by collimating lens 34. The collimated beam is deflected by the rotating mirror 36 to the f-theta lens 38.

In FIG. 2A, the combined beam is deflected to mirror 46 which deflects the beam downwards towards mirror 48 for the reference beam, marked 74, and towards the scanning medium 40 (not shown) for the exposure beam, marked 76. Mirror 48 deflects the reference beam 74 towards the BPD 42. In FIG. 2B, the combined beam is deflected to the mirror 44 which separates the reference beam from the exposure beam. The reference beam 74 hits the BPD 42 while the exposure beam 76, hits the scanning medium 40 (not shown).

Figure 3:
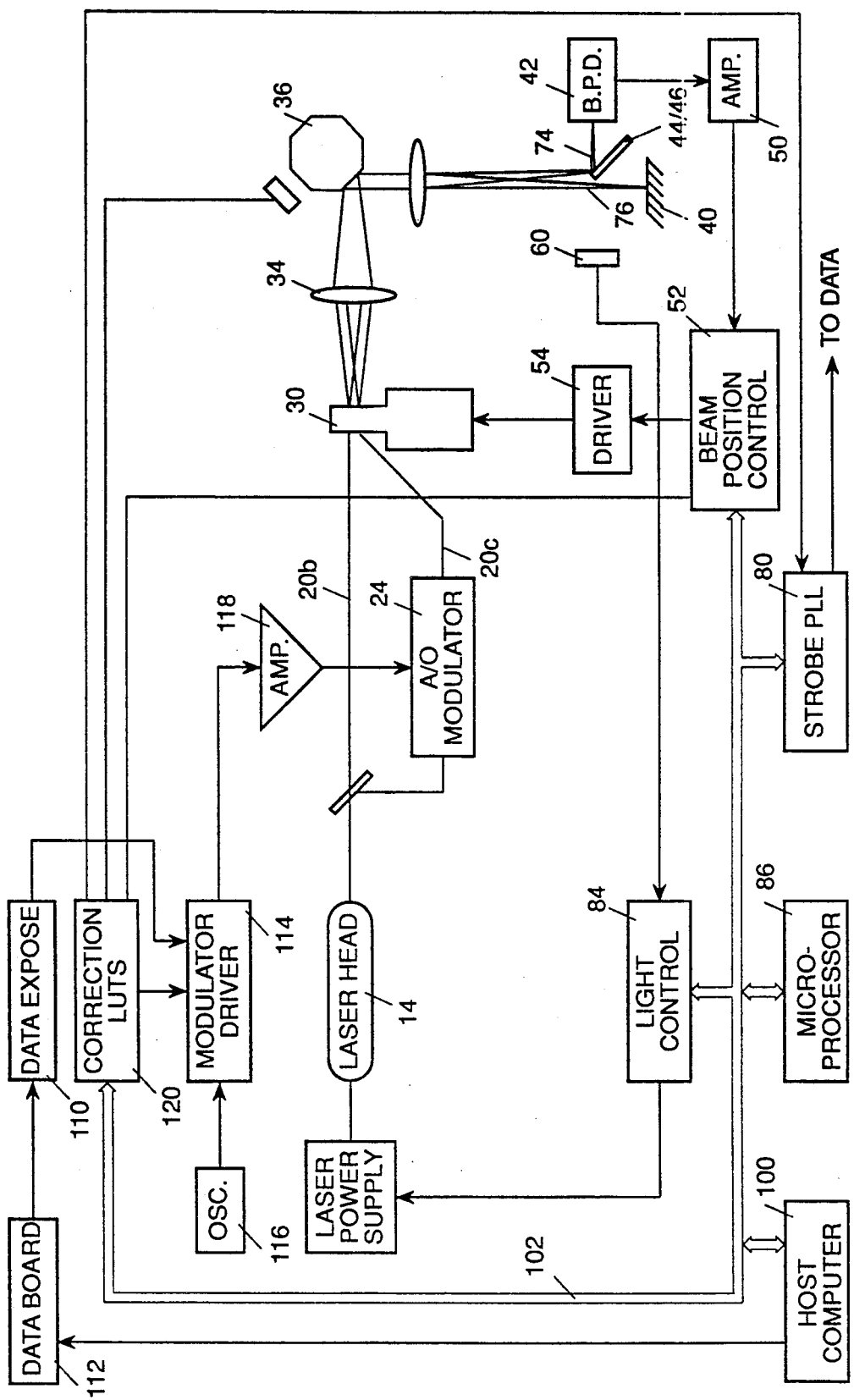
FIG. 3 is a block diagram illustration of electronic elements useful in the apparatus of FIGS. 1A and 1B.

Reference is now made to FIG. 3 which illustrates, in block diagram form, the electrical and optical elements of the apparatus of the present invention, in a plotter embodiment, and the El-Op subsystem necessary for operating it.

In the El-Op subsystem, the BPD amplifier 50 receives the voltage signals from the two sensors of the BPD 42, as described in European Application 0,263,744, and sums them. The resulting voltage, proportional to the beam intensity, is then converted to a clock (CLK) pulse. A voltage signal is generated every predetermined number of microns. Thus, a CLK pulse frequency with a predetermined pulse width is provided.

A Strobe PLL board 80 multiplies the CLK frequency into a pulse train of EXP CLK signals. Each EXP CLK signal is sent to a Data subsystem (not shown) from there to a Beam Control board. Each EXP CLK signal instructs the Data subsystem to send data for one exposure point to the Beam Control board.

The Beam Control board executes data modulation and contains a correction LUT 120 that stores the intensity values along a scan line, necessary for correcting known mirror variations and known variations in the transmittance of the f-theta lens 38 due to the angle of the transmitted light. The corrections provided by the LUT 120 help to produce a uniform light intensity on the scanning medium 40. The beam position detector pulses, received through a data bus 102, advance the LUT addresses so that the proper laser intensity is applied along the entire line.

In a plotter system, Beam Control board also comprises a data board 112, such as a screen processor, which accepts data to be plotted from host computer 100. From the data board 112, the data is sent to a data expose board 110 which synchronizes and modulates the digital data signal and transforms it into an appropriate intensity level.

The data from the LUT 120 and the data expose board 110 are sent to a modulator driver 114 which modulates a high frequency signal, typically 110 MHz, received from an oscillator 116 in accordance with the signals received from the data expose board 110 and the LUT 120. The data expose board 110 indicates the required on or off state of the exposure beam 76 and the LUT 120 indicates the degree of intensity of the exposure beam 76.

The signal produced by the modulator driver 114 is amplified by an amplifier 118 and the amplified signal is then applied to the acousto/optic modulator 24 for modulation of the exposure beam.

To measure and control the light intensity of the exposure beam, a light detector 60, such as a PIN diode, is typically located near mirror 46 of the embodiment of FIG. 1A or near mirror 44 of the embodiment of FIG. 1B. For the purposes of clarity, light detector 60 is not shown in either FIG. 1A or 1B.

The light detector 60 produces a signal proportional to the intensity of the received light at either mirror 44 or mirror 46. The resultant signal is operated on by a light control system 84, comprising D/A converters, drivers and clock circuits, for controlling the light intensity of the exposure beam 76.

System microprocessor 86 stores the values used for the pre-positioning signal. It interfaces with the apparatus of the present invention via data bus 102.

In summary, the optical components that lie in the optical path of the laser beam are responsible for directing the path of a modulated exposure beam of correct intensity to the scanning medium 40. These components are controlled by the El-Op subsystem, which adjusts the beam position, modulates the beam and adjusts the beam intensity.

Figure 4:
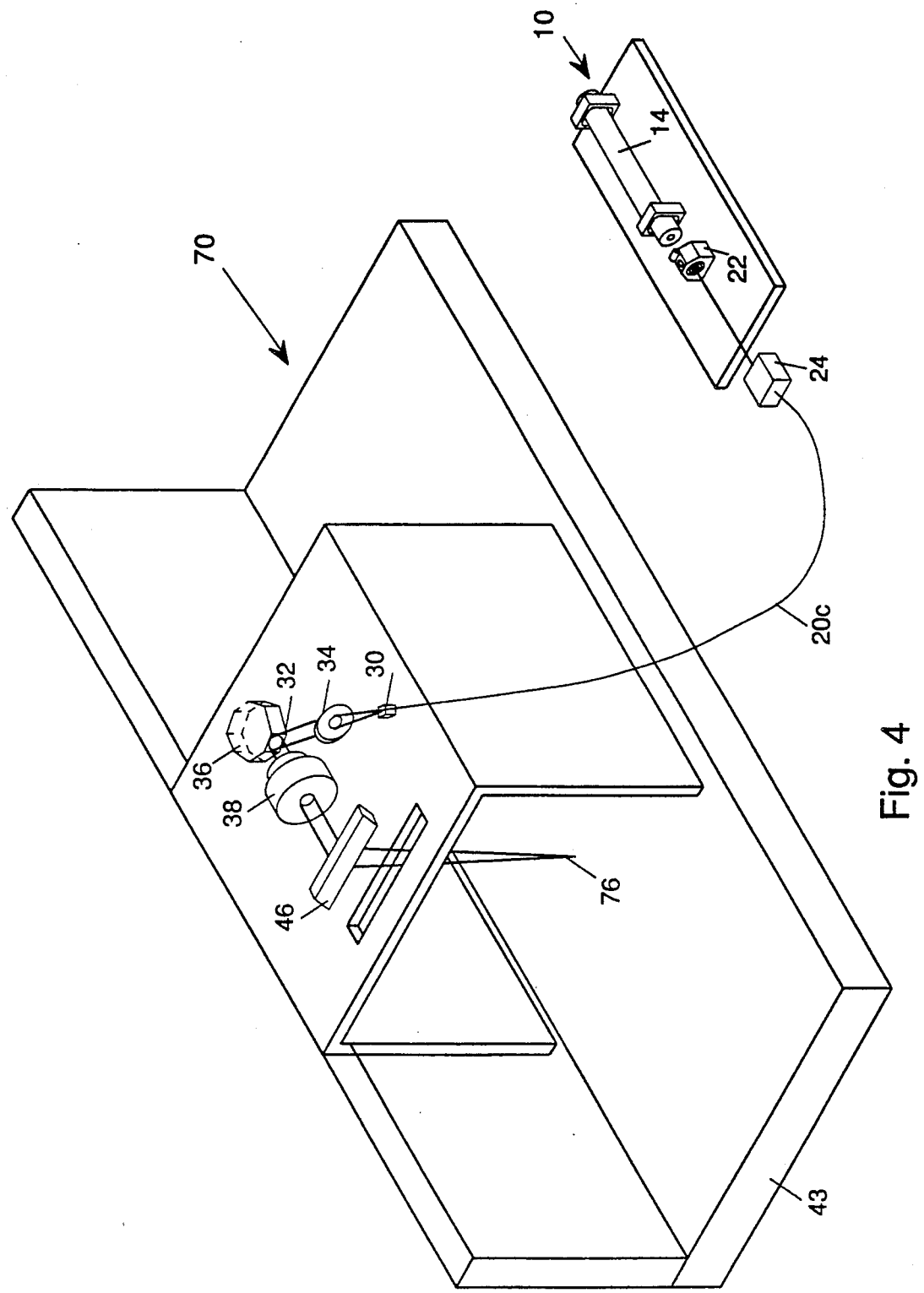
FIG. 4 is a mechanical illustration of an alternative embodiment of the present invention wherein the scanning elements travel along a fixed base.

It will be appreciated that the present invention can be applied to laser scanning systems which produce a single exposure beam using fiber optic lightguides. The single fiber-optic lightguide is moved via a piezoelectric actuator which is controlled by pre-positioning signals, as described hereinabove, rather than through feedback signals received as a result of a reference beam hitting a beam position detector. This alternative embodiment of the present invention is shown in FIG. 4 for a laser beam scanning apparatus with a fixed base.

Additionally, the present invention can be applied to laser scanning systems which combine the reference and exposure beams into a single beam which can be transmitted via a single fiber optic lightguide.

It will be appreciated by persons skilled in the art that the present invention is not limited by what has been particularly shown and described hereinabove. Rather the scope of the present invention is defined only by the claims which follow:

I claim:

1. Laser scanning apparatus comprising:
   a stationary optical laser source for producing a scanning beam and a reference beam;
   at least one fiber optic lightguide;
   a beam delivery system; and
   a beam position detector and corrector system;
   wherein said at least one fiber optic lightguide is operative to deliver said scanning beam and said reference beam from said optical laser source to said beam delivery system;
   wherein said beam delivery system is operative to deliver said scanning beam to a surface to be scanned and said reference beam to said beam position detector and corrector system; and
   wherein said beam position detector and corrector system is operative to measure and correct a position of said scanning beam by sensing a position of said reference beam.

2. Laser scanning apparatus according to claim 1 and also comprising motor means for translation of said beam delivery system with respect to said surface to be scanned.

3. Laser scanning apparatus according to claim 1 and also comprising means for adjusting the intensity of said scanning beam as a function of its relative position along a scanning axis.

4. Laser scanning apparatus according to claim 1 and also comprising means for synchronizing data flow with said position of said scanning beam.

5. Laser scanning apparatus according to claim 1 and wherein said at least one fiber optic lightguide comprises at least one single-mode fiber optic lightguide.

6. Laser scanning apparatus according to claim 5 and wherein said beam position detector and corrector system includes detector means for detecting said position of said reference beam, actuator means attached to exit ends of said at least one fiber optic lightguide and closed loop control means for controlling said actuator means in response to measurements produced by said detector means.

7. Laser scanning apparatus according to claim 6 and wherein said actuator means are piezoelectric actuator means.

8. Laser scanning apparatus according to claim 1 and wherein said beam position detector and corrector system includes detector means for detecting said position of said reference beam, actuator means attached to exit ends of said at least one fiber optic lightguide and closed loop control means for controlling said actuator means in response to measurements produced by said detector means.

9. Laser scanning apparatus according to claim 8 and wherein said actuator means are piezoelectric actuator means.

10. Laser scanning apparatus according to claim 8 and also comprising motor means for translation of said beam delivery system with respect to said surface to be scanned.

11. Laser scanning apparatus according to claim 8 and wherein said closed loop control means also include pre-positioning means for counteracting known initial variations in said beam delivery system.

12. Laser scanning apparatus according to claim 8 and also comprising means for adjusting the intensity of said scanning beam as a function of its relative position along a scanning axis.

13. Laser scanning apparatus according to claim 8 and also comprising means for synchronizing data flow with said position of said scanning beam.

14. Laser scanning apparatus according to claim 8 and wherein said fiber optic lightguide comprises at least one single-mode fiber optic lightguide.

15. Laser scanning apparatus according to claim 8 and wherein said at least one actuator comprises piezoelectric actuator means.

16. Laser scanning apparatus comprising:

a stationary optical laser source for producing a scanning beam;
a fiber optic lightguide;
a beam delivery system; and
a beam position detector and corrector system;
wherein said fiber optic lightguide is operative to deliver said sanning beam from said optical laser source to said beam delivery system, and
wherein said beam position detector and corrector system is operative to measure and correct a position of said scanning beam.

* * * * *